United States Patent Office 3,447,993
Patented June 3, 1969

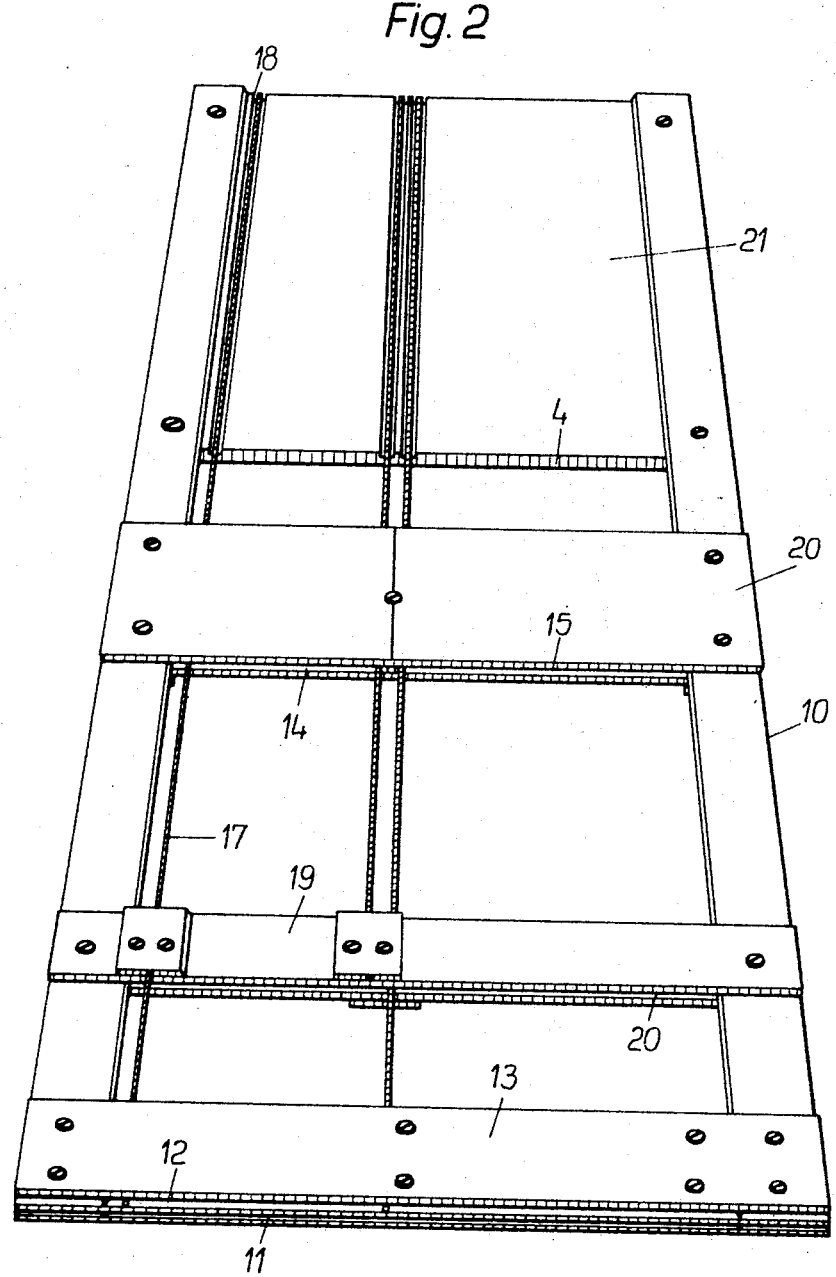

3,447,993
APPARATUS FOR CONTINUOUS PRODUCTION OF MULTI-LAYER WATCHBANDS
Hilmar Herzog, Nottingen, near Pforzheim, Germany, assignor to Gustav Bauer, KG Guba-Uhrenrohwerke, Ellmendingen, Germany, a corporation of Germany
Filed Apr. 28, 1965, Ser. No. 451,474
Int. Cl. B32b 31/18, 31/26
U.S. Cl. 156—461                6 Claims

ABSTRACT OF THE DISCLOSURE

A watch band is produced from a plurality of layers of sheet material by seaming the edges of the band in a sealing station. The layers are fed to the sealing station in the form of flat tapes, one or more of the layers being folded over, before seaming, to form a loop at one or both ends of the band. A loop is formed by being folded over a string, or similar elongated object, which is fixed to the seaming apparatus.

---

The present invention relates to a method and an apparatus carrying out the method, for the continuous production of watchbands from thermoplastic material, and the watchbands produced thereby, and more particularly to the type of watchbands which have reinforcing inserts.

Multi-layer watchbands made of thermoplastic material usually consist of a pair of outer layers and an inner reinforcing layer. One of the outer layers, usually the one intended to be worn next to the arm of the user, has a surface similar to textiles; it may be, for example of polyvinyl chloride material, with a soft silky surface. The other layer, the one intended to be visible, may be embossed to simulate leather. A reinforcing layer is inserted between these two outer layers in order to improve the strength and form stability of the watchband.

It is an object of the present invention to provide a method and an apparatus to manufacture such watchbands in large quantities, and by mass production methods, and to provide an apparatus to carry out such method.

It is a further object of the present invention to provide a watchband which can be readily manufactured by mass production methods, automatically, and without the use of hand labor.

Briefly, in accordance with the method of the present invention, the watchbands are made by applying superimposed layers of material forming the top layer, the bottom layer, and the reinforcing insert, to a seaming station, such as a heat sealing station. The tapes are wide enough so that the watchbands to be formed will be arranged cross-wise of the tape. Prior to the sealing, the edge portion of the insert layer is folded over in order to form a loop, through which the pin of the watch, or of the buckle, may pass. Adjacent watchband sections, thus formed on the tape, are then separated.

In accordance with a feature of the invention, a pair of sections of a watchband, such as the buckle section and the attachment section, can be formed side by side. The insert for the section which is to have the buckle attached will have the end portions folded over at both ends—one end for the watch, and the other for the buckle. The other section, the one for attachment to the buckle, need be folded over only once. The region intermediate these two sections will be heat sealed together, for later separation, either by the machine or by the user.

By feeding wide tapes and arranging the watchbands on the tapes cross-wise, very high production and good efficiency of use of the material can be achieved. Each time that the heat sealing station seals the layers together, one or more complete watchbands are made, without the necessity of manual handling or precutting of material. Feeding the tapes cross-wise permits automatic folding of the loop for the watch or buckle pins, enabling a simple production method and providing for uniformity in the product.

It is a further feature of the invention to provide a watchband which is manufactured in a single process step, by heat sealing a plurality of layers together, on a tape at least as wide as the length of the watchband, or a plurality of watchband sections, for later separation of the sections into individual watchbands or watchband sections.

The layers forming the watchband, that is the outer layers and the reinforcing insert, are fed from a supply reel to a frame. This frame is arranged with slits which properly locate the various layers with respect to each other, and furthermore fold the edge, or edges of the reinforcing layer. In order to prevent unintentional sealing of the loop for the watch, or buckle pin, the frame is preferably provided with an elongated spacer member, such as a long wire, or artificial fiber string, secured to the frame at an end near the fold-over station of the frame. The other end is free, so that as the watchbands are being formed, the loop can slip off the free end of the spacer member. These spacer members prevent compression of the loops during the seaming or heat sealing operation and further assure that the loops will be perpendicular to the longitudinal direction of the watchband, and have the proper dimensions.

The structure, organization and operation of the invention will now be described more specifically in the following detailed description with reference to the accompanying drawings, in which:

FIG. 2 is a perspective view of a frame, to a larger scale, for use in the apparatus according to FIG. 1;

Figure 3:
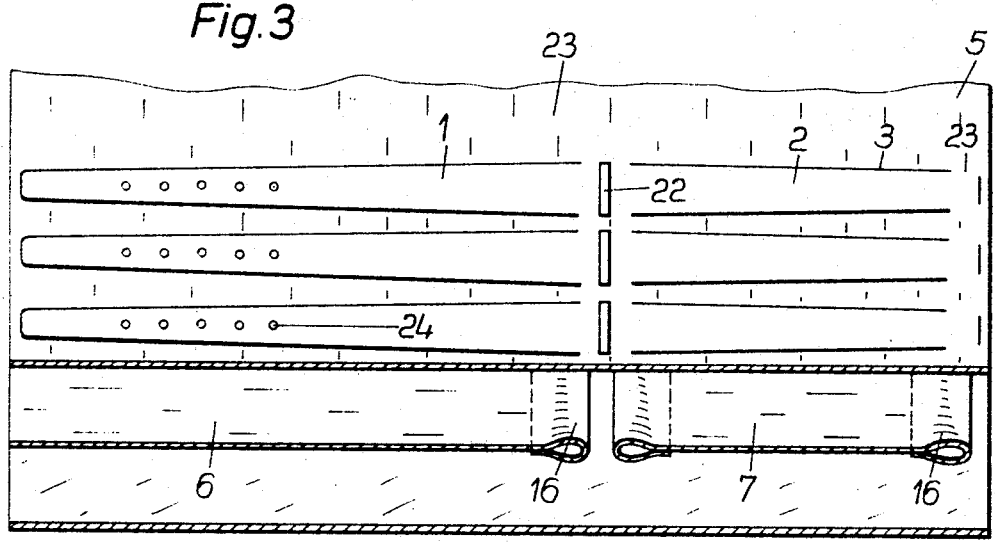
FIG. 3 is a plan view, partly cut-away, of watchbands formed in accordance with the present invention before being separated from each other.

Referring first to FIG. 3, where the watchbands are illustrated: The watchbands consist of two sections, 1 and 2. The sections 1 and 2 are formed of several superposed layers, consisting of thermoplastic material, and heat sealed or welded together at their edges 3. The layers themselves are supplied to the machine (see FIG. 1) in the form of endless tapes 4, 5, 6 and 7. The outer layers 4 and 5, may have the textaure and appearance of fabric or leather, as desired.

Reinforcement layers 6 and 7 are arranged parallel to each other, between the outer layers 4 and 5. Layers 6 and 7 may consist of textile or glass fibers bonded, or impregnated with thermoplastic material. All layers 4 to 7 are applied to a heat sealing or heat welding station 8, having a welding form 9 in accordance with the shape of the outline of the watchband which is desired to be produced. The welding and sealing device 8 is not further described in detail because it does not form part of the present invention, and may be any standard thermoplastic sealing, or other seaming device, well known in the art.

Figure 1:
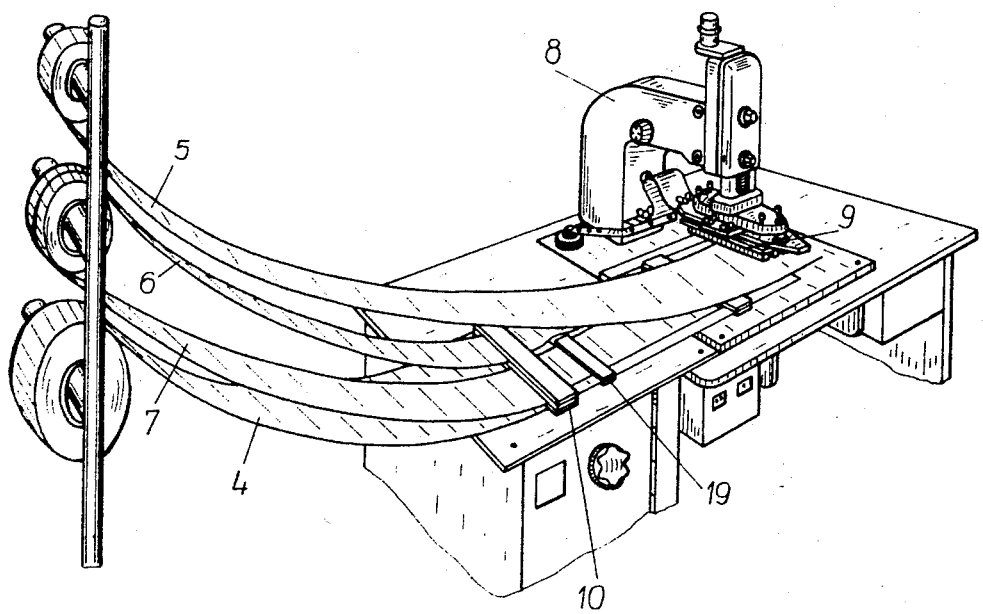
FIG. 1 is a perspective view of an apparatus carrying out the method of the present invention.
Figure 4:
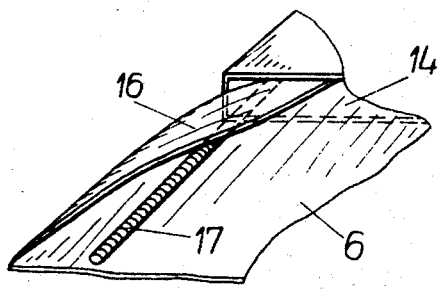
FIG. 4 is a perspective view of the folding arrangement of the frame of FIG. 2.

The sealing head 9 cooperates with a frame 10 secured to the machine 8 (see FIGS. 1 and 2). Frame 10, at the end where the tapes are to be threaded in, has a plurality of slits 12, 13 in order to guide the tapes into position. Slits 14, 15 are arranged to form the reinforcement tapes such that loops 16 (FIG. 3) are formed as the tape is fed into the machine. The loops are formed by folding over the edge portion of reinforcement tape 6, see particularly FIG. 4, in order to provide a loop for passing the pins of the watch case therethrough, or a pin of a buckle if the buckle end is to be made. The edges of the slits 14, 15, are shaped such that the loop is formed automatically as the tape passes therethrough (see particularly, again FIG. 4). In order to assure that the loops 16 are of sufficient size and are not compressed during the sealing or welding process, nylon filaments or strings 17 are provided, secured to the frame 10 for example by being clamped to cross pieces 13, 19 (see FIG. 2) and passing through the slits 14, 15. The trailing ends 18 of filaments 17 are free, so that the loops formed over the filaments may be stripped off without hindrance. The cross piece 19 is formed wtih a pair of parallel slits, one of which is shown at 20, in order to guide the reinforcement tapes 6, 7 parallel to each other and between the outer layers 4 and 5, while simultaneously providing for folding over of both edges of one of the tapes 6, 7, and folding over of one edge of the other of the tapes 6, 7.

After leaving the slits 14, 15, formed in cross piece 20 of the frame, the tape 5 forming the top layer is applied over the now folded over insert tapes (see FIG. 1) and the sealing and welding operation can occur within region 21 of the frame, by passing the head 9 downwardly against the layers of material. The watchbands 1, 2, formed by this process can then merely be broken out from the rest of the tape. Between the portions 1, 2, a cross piece 22 is arranged, in order to provide for a definite and final seal of the ends of the bands. Within the region of the loop 16, the edge portion of the bands 3 is left unsealed, as seen at 23, FIG. 3 in order to provide free space for insertion of the watch, or buckle pins. Holes for insertion of the buckle itself may be formed simultaneously as the welding head 9 is brought down against the layers of plastic tapes. The layers themselves are thus welded together within the region of these holes.

Tapes 4, 5, 6 and 7 can be fed to the machine by means of a transport mechanism coupled automatically with the operation of the welding machine 8, such that the watchbands are formed entirely automatically. Feed controls well known in the punch and plastic sealing art can be utilized for this purpose.

The invention thus provides a method of manufacturing watchbands, and apparatus for such manufacture, and a watchband itself made in a single operation, and providing for a plurality of sealed, joined outerlayers, and a central reinforcing layer having one or two loops for the passage of watch, or buckle pins therethrough.

I claim:

1. Apparatus to manufacture plastic watchbands from tapes of plastic materials, said watchbands each having a pair of outer layers and a reinforcing inner layer; said apparatus having means feeding said flat tapes to form said layers; a seaming means for sealing and seaming said layers; said feeding means including a guide frame formed with entrance slits adapted to have said tapes of materials applied therethrough, the slit adapted to receive said reinforcing insert tape having means to fold over back upon itself at least one edge portion to form a loop; said seaming means being formed in the desired outline of the watchband and arranged at a right angle with respect to the direction of feed of said feeding means.

2. Apparatus as claimed in claim 1, said sealing means forming a seal of all said layers along an outline defining a plurality of watchbands, each portion of said outline being in the form of a watchband.

3. Apparatus as claimed in claim 1, including an elongated spacer member secured at one end to said frame and extending into the slit for said reinforcing insert layer in the region of the fold thereof, said elongated spacer member being free from said frame at the end remote from said feeding means of the tapes whereby said spacer, during seaming, will prevent adhesion of the loop, and the watchbands will be free to be stripped off from said free end of said spacer member as the tapes continue to feed.

4. Apparatus as claimed in claim 3, said frame having a plurality of slits adapted to receive a plurality of parallel reinforcing insert layer tapes, and at least one spacer member secured to said frame at one end thereof associated with each said slit.

5. Apparatus as claimed in claim 3, said spacer member comprising a flexible wire secured at one end to said frame.

6. Apparatus as claimed in claim 3, said spacer member comprising an artificial fiber string.

References Cited

UNITED STATES PATENTS

| 2,153,351 | 4/1939 | Steinberger | 161—149 XR |
| 2,281,635 | 5/1942 | Strauss | 161—89 |
| 2,798,523. | 7/1957 | Barrett | 156—200 XR |

EARL M. BERGERT, *Primary Examiner.*

G. W. MOXON II, *Assistant Examiner.*

U.S. Cl. X.R.

156—467, 554